US012603536B2

(12) United States Patent
Eguchi et al.

(10) Patent No.: US 12,603,536 B2
(45) Date of Patent: Apr. 14, 2026

(54) MOTOR HOUSING AND METHOD FOR MANUFACTURING A MOTOR HOUSING

(71) Applicant: MAHLE International GmbH, Stuttgart (DE)

(72) Inventors: Akihiko Eguchi, Shizuoka (JP); Shota Nogiwa, Shizuoka (JP); Yuki Suzuki, Shizuoka (JP); Tamotsu Tanaka, Shizuoka (JP); Ryosuke Tonooka, Shizuoka (JP)

(73) Assignee: Mahle International GmbH (DE)

( * ) Notice: Subject to any disclaimer, the term of this patent is extended or adjusted under 35 U.S.C. 154(b) by 194 days.

(21) Appl. No.: 18/384,831

(22) Filed: Oct. 27, 2023

(65) Prior Publication Data

US 2024/0146144 A1 May 2, 2024

(30) Foreign Application Priority Data

Oct. 27, 2022 (JP) ................................. 2022-172351

(51) Int. Cl.
| | |
|---|---|
| *H02K 5/06* | (2006.01) |
| *B21D 28/26* | (2006.01) |
| *H02K 15/14* | (2006.01) |

(52) U.S. Cl.
CPC .............. *H02K 5/06* (2013.01); *B21D 28/26* (2013.01); *H02K 15/14* (2013.01)

(58) Field of Classification Search
CPC ........ B21D 28/26; B22D 15/02; B22D 17/00; B23P 15/00; H02K 15/14; H02K 5/06
See application file for complete search history.

(56) References Cited

U.S. PATENT DOCUMENTS

| | | | |
|---|---|---|---|
| 8,816,550 B2 | 8/2014 | Kim | |
| 2019/0157943 A1 | 5/2019 | Ge | |
| 2019/0260256 A1 | 8/2019 | Heinz | |

FOREIGN PATENT DOCUMENTS

| | | | | |
|---|---|---|---|---|
| CN | 204858799 U | | 12/2015 | |
| CN | 106877578 B | * | 11/2018 | ............... H02K 1/20 |
| DE | 10328720 A1 | * | 1/2005 | ............. H02K 3/522 |
| DE | 102018202408 A1 | | 8/2019 | |
| JP | 2016171717 A | | 9/2016 | |
| JP | 2019170013 A | | 10/2019 | |
| JP | 2020065358 A | | 4/2020 | |
| JP | 2022020206 A | * | 2/2022 | |

OTHER PUBLICATIONS

DE-10328720-A1, all pages (Year: 2005).*
CN-106877578-B, all pages (Year: 2018).*
JP-2022020206-A, all pages (Year: 2022).*
German Search Report, DE 10 2023 210 479.2, dated Jun. 28, 2024 (w_machine_translation).

* cited by examiner

*Primary Examiner* — Naishadh N Desai
(74) *Attorney, Agent, or Firm* — Fishman Stewart PLLC

(57) ABSTRACT

A motor housing may include a cast body. The cast body may include a cylindrical portion. At least one machined surface may be disposed on at least one of (i) an inner peripheral surface of the cylindrical portion and (ii) an outer peripheral surface of the cylindrical portion. A back side of the at least one machined surface may be an exposed non-machined surface.

20 Claims, 2 Drawing Sheets

MOTOR HOUSING AND METHOD FOR MANUFACTURING A MOTOR HOUSING

CROSS-REFERENCE TO RELATED APPLICATION

This application claims priority to Japanese Patent Application No. JP 2022-172351, filed on Oct. 27, 2022, the contents of which is hereby incorporated by reference in its entirety.

TECHNICAL FIELD

The present invention relates to a motor housing and a method for manufacturing a motor housing, and specifically relates to a motor housing molded by die casting or casting, and a method for manufacturing a motor housing.

BACKGROUND

To prevent the infiltration of water etc. to the inside of a motor housing or leakage of gas from the inside the motor housing, it has been required that a motor housing does not communicate between the inside and outside thereof. Meanwhile, there are cases where a motor housing is molded by a casting method such as die casting. However, a blowhole may be generated inside the molded motor housing. An inner peripheral surface of a motor may be subjected to cutting to improve the dimensional accuracy; however, a blowhole may be exposed at the surface due to the cutting, which may cause an unintended communication between the inside and outside of the motor housing. Therefore, in Patent Literature 1 for example, a disk drive device having a screw attachment member 42, in addition to having a base member 41 for demarcating an inner peripheral surface of a motor housing, has been proposed. According to Patent Literature 1, even if the inner peripheral surface of the motor housing is subjected to cutting, communication between the inside of the motor housing and a screw hole can be prevented.

CITATION LIST

Patent Literature

[Patent Literature 1] JP 2016-171717 A

In the aforementioned Patent Literature 1, a screw attachment member, in addition to a base member, is required, which is a factor of cost increase. Although methods for preventing communication between an inner peripheral surface and outer peripheral surface due to cutting, such as resin impregnation and vacuum suctioning, are also well-known, these steps must be added, which of course is a factor of cost increase.

Thus, the present invention has taken the aforementioned problem into consideration, with the objective of preventing a communication between the inside and the outside of a motor housing with a simple configuration.

SUMMARY

In order to solve the aforementioned problem, the motor housing according to the present invention, which is a casting comprising a cylindrical portion, has a machined surface located on an inner peripheral surface or outer peripheral surface of the cylindrical portion, where a back side of the machined surface is an exposed non-machined surface. According to this mode, because the back side of the machined surface is a non-machined surface, communication between an inner peripheral surface and outer peripheral surface of a cylindrical portion due to a casting blowhole can be prevented.

The motor housing may have the machined surface at both the inner peripheral surface and the outer peripheral surface. According to this mode, even if the motor housing has the machined surface at both the inner peripheral surface and the outer peripheral surface, because the back side of the machined surface is a non-machined surface, communication between an inner peripheral surface and outer peripheral surface of a cylindrical portion due to a casting blowhole can be prevented.

The non-machined surface on the back side of the machined surface located on the outer peripheral surface may be located in a recess recessed from a machined surface located on the inner peripheral surface. According to this mode, because cutting of the recess can be easily avoided, cutting can be easily implemented on the inner peripheral surface.

The machined surface located on the outer peripheral surface may be located on a convex portion that protrudes from a non-machined surface located on the outer peripheral surface. According to this mode, because cutting of a section which is meant to be a non-machined surface of the outer peripheral surface can be easily avoided, the outer peripheral surface can be easily subjected to cutting.

In order to solve the aforementioned problem, the method for manufacturing a motor housing according to the present invention includes the steps of: molding a semi-finished product having a cylindrical portion by casting; and cutting an inner peripheral surface or outer peripheral surface of the cylindrical portion of the semi-finished product so that a back side of a machined surface is an exposed non-machined surface.

Both the inner peripheral surface and the outer peripheral surface may be subjected to cutting. The semi-finished product may be molded so that a recess is formed at an inner peripheral surface, on the back side of a section of the outer peripheral surface to be subjected to cutting. The semi-finished product may be molded so that a convex portion is formed at a section of the outer peripheral surface to be subjected to cutting.

DETAILED DESCRIPTION

Figure 1:
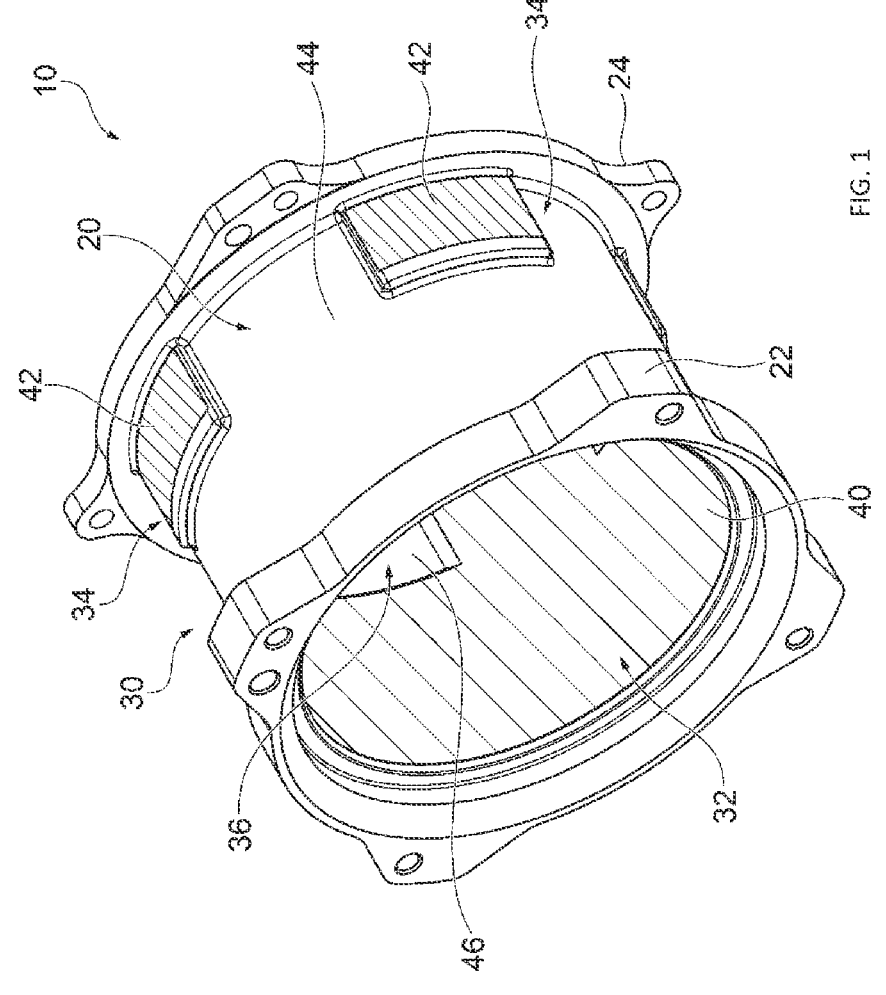
FIG. 1 is a perspective view of motor housing 10 according to the present embodiment.
Figure 2:
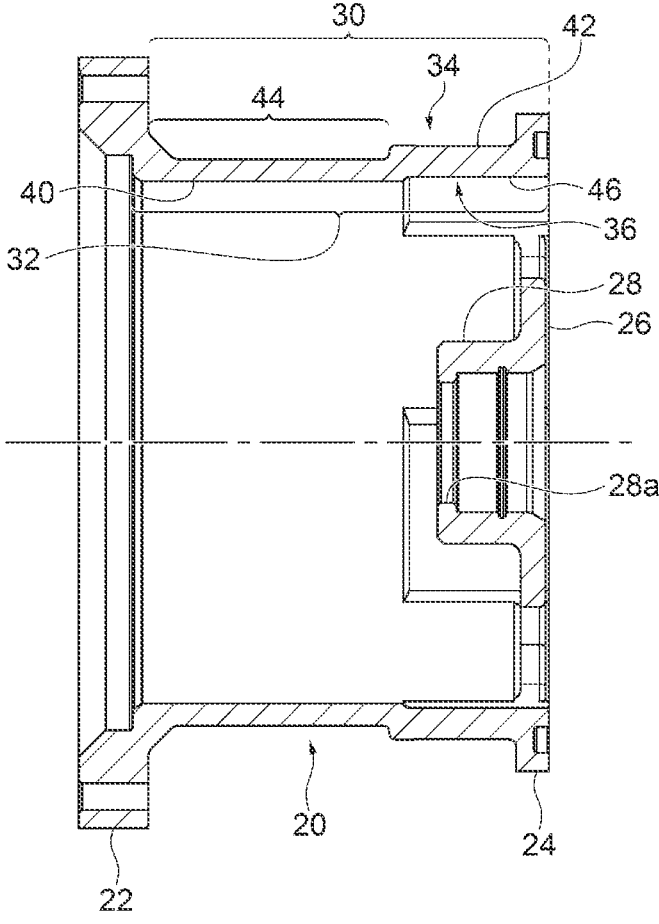
FIG. 2 is a cross-sectional view taken along the vertical plane, which includes the central axis of the motor housing 10 according to the present embodiment.

FIG. 1 is a perspective view of the motor housing 10 according to the present embodiment. FIG. 2 is a cross-sectional view taken along the vertical plane, which includes the central axis of the motor housing 10 according to the present embodiment. The motor housing 10 has a cylindrical portion 20, first flange 22, second flange 24, bottom portion 26 and protruding portion 28. The first flange 22 and second flange 24 are formed at both end portions of cylindrical portion 20. The bottom portion 26 is formed at the end portion of the second flange 24 side of cylindrical portion 20. The protruding portion 28 protrudes from the bottom portion 26 towards the inside of motor housing 10. The protruding portion 28 is formed in a bottomed round cylindrical shape, and an opening 28a is formed at the bottom portion through which a motor axis is inserted.

The cylindrical portion 20 has an outer peripheral surface 30 and inner peripheral surface 32. The outer peripheral surface 30 has four convex portions 34. Of course, the number of convex portions 34 is not limited to four. These convex portions 34 are used in order for the motor housing 10 to be held by a conveyance robot, or a chuck; namely a positioning jig. A convex portion 34 is formed rectangularly and is formed at the outer peripheral surface 30 so that the long side is in contact with second flange 24. The length of the axial direction of a convex portion 34 is about ⅓ of the outer peripheral surface 30.

The motor housing 10 is a die cast molded product molded by die casting. The motor housing 10 may also be a casting molded by other casting methods. Because the motor housing 10 is a die cast molded product, the dimensional accuracy of the surface thereof is not so high. However, a stator (not shown) is disposed inside the motor housing 10, and a rotor (not shown) is further disposed inside thereof. The inner peripheral surface 32 requires a high dimensional accuracy in order to ensure a suitable clearance between the stator and the inner peripheral surface 32 of motor housing 10. Therefore, the inner peripheral surface 32 has a machined surface 40. The machined surface 40 extends over the entire inner peripheral surface 32, except for the area where a stator is inserted; namely, recess 36.

Moreover, with the motor housing 10 in a state of having been held by a conveyance robot, a stator is inserted inside the motor housing 10 and thus assembled. At this time, accuracy of the sections where the motor housing 10 is held by the conveyance robot is also demanded, in order to avoid interference between the stator and motor housing 10, and to achieve precise positioning of the stator. Specifically, it is demanded that the surface of a convex portion 34 held by a conveyance robot is precisely located at the concentric circle of inner peripheral surface 32. Therefore, the surface of the convex portion 34 has a machined surface 42. The machined surface 42 extends over substantially the entire top surface of convex portion 34.

Meanwhile, there is a possibility that a blowhole is generated inside the motor housing 10 molded by a casting method such as die casting. A blowhole may be exposed at the surface due to cutting, and may be a cause of an unintended communication between the outer peripheral surface 30 and inner peripheral surface 32 of motor housing 10.

In relation to this, although methods for preventing communication between an inner peripheral surface and outer peripheral surface due to cutting, such as resin impregnation, vacuum suctioning, airtightness inspection of all blowholes, etc., have also been considered, these are factors of cost increase. Although relief processing in the axial direction has also been considered, wasted parts, namely wasted thickness is generated, and it is difficult to suppress the size and cost.

Therefore, in the motor housing 10 according to the present embodiment, the back side of machined surface 40 is an exposed non-machined surface 44. Moreover, the back side of machined surface 42 is an exposed non-machined surface 46. Thereby, communication between the inner peripheral surface 32 and outer peripheral surface 30 of cylindrical portion 20 due to a casting blowhole can be prevented. The term "exposed" indicates not being covered by being in contact with a resin, adhesive, or other member etc., and does not mean being on the outer peripheral surface.

The motor housing 10 according to the present embodiment has the machined surface 40 and machined surface 42 at both the inner peripheral surface 32 and outer peripheral surface 30. Namely, the machined surface 40 is formed at the inner peripheral surface 32, and the machined surface 42 is formed at the outer peripheral surface 30. In the present embodiment, the motor housing 10 is configured in this way so that even if the motor housing 10 has the machined surface 40 and machined surface 42 at both the inner peripheral surface 32 and outer peripheral surface 30, the back side of machined surface 40 is the exposed non-machined surface 44, and the back side of machined surface 42 is the exposed non-machined surface 46.

Specifically, the non-machined surface 46 on the back side of the machined surface 42 located on the outer peripheral surface 30 is located in the recess 36 recessed from the machined surface 40 located on the inner peripheral surface 32. Thereby, because cutting of the recess 36 can easily be avoided, the inner peripheral surface 32 can easily be subjected to cutting.

Moreover, the machined surface 42 located on the outer peripheral surface 30 is located on a convex portion 34 that protrudes from the non-machined surface 44 located on the outer peripheral surface 30. Thereby, because cutting of the section which is meant to be the non-machined surface 44 of outer peripheral surface 30 can easily be avoided, the outer peripheral surface 30 can easily be subjected to cutting.

The method for manufacturing a motor housing 10 is explained, the method for manufacturing a motor housing 10 includes the steps of: molding a semi-finished product having the cylindrical portion 20 by casting; and cutting the inner peripheral surface 32 or outer peripheral surface 30 of the cylindrical portion 20 of the semi-finished product so that the back side of machined surface 40 is the exposed non-machined surface 44, and the back side of machined surface 42 is the non-machined surface 46.

Specifically, a semi-finished product is molded so that the recess 36 is formed at the inner peripheral surface 32, on the back side of a section of outer peripheral surface 30 to be subjected to cutting. Thereby, because cutting of the recess 36 can be easily avoided, the inner peripheral surface 32 can easily be subjected to cutting. Moreover, the semi-finished product is molded so that the convex portion 34 is formed at the section of outer peripheral surface 30 to be subjected to cutting. Thereby, because cutting of the section meant to be the non-machined surface 44 of outer peripheral surface 30 can easily be avoided, the outer peripheral surface 30 can easily be subjected to cutting.

The present invention is explained as above by referring to the embodiment; however, the present invention is not limited to the aforementioned embodiment, where suitably combined or substituted configurations of the embodiment are also included in the present invention. Moreover, combinations or orders of processes may be suitably rearranged in the embodiment, or modifications such as design changes may be added to the embodiment, based on the knowledge of the person skilled in the art, where embodiments to which such modifications were added may also be included in the scope of the present invention.

The invention claimed is:
1. A motor housing, comprising:
a cast body including a cylindrical portion;
at least one machined surface disposed on at least one of
  (i) an inner peripheral surface of the cylindrical portion and (ii) an outer peripheral surface of the cylindrical portion;

wherein a back side of the at least one machined surface is an exposed non-machined surface;

wherein the at least one machined surface includes an outer machined surface disposed on the outer peripheral surface; and wherein the outer machined surface is arranged on a convex portion that protrudes from a non-machined surface disposed on the outer peripheral surface.

2. The motor housing according to claim 1, wherein the at least one machined surface further includes an inner machined surface disposed on the inner peripheral surface.

3. The motor housing according to claim 1, wherein the non-machined surface on the back side of the outer machined surface is disposed in a recess, which is recessed from a machined surface disposed on the inner peripheral surface.

4. A method for manufacturing a motor housing, comprising:

molding a semi-finished product including a cylindrical portion via casting; and cutting at least one of an inner peripheral surface of the cylindrical portion and an outer peripheral surface of the cylindrical portion such that a back side of a machined surface is an exposed non-machined surface;

wherein the machined surface includes an outer machined surface disposed on the outer peripheral surface of the cylindrical portion; and wherein the outer machined surface is arranged on a convex portion that protrudes from a non-machined surface disposed on the outer peripheral surface of the cylindrical portion.

5. The method according to claim 4, wherein cutting the at least one of the inner peripheral surface and the outer peripheral surface includes cutting both the inner peripheral surface and the outer peripheral surface.

6. The method according to claim 4, wherein molding the semi-finished product includes forming a recess at the inner peripheral surface on a back side of a section of the outer peripheral surface to be subjected to cutting.

7. The method according to claim 4, wherein molding the semi-finished product includes forming the convex portion at a section of the outer peripheral surface to be subjected to cutting.

8. The motor housing according to claim 2, wherein:

the non-machined surface on the back side of the outer machined surface is disposed in a recess, which is recessed from the inner machined surface; and the convex portion with the outer machined surface protrudes from the non-machined surface on the back side of the inner machined surface.

9. A motor housing, comprising a die cast body including a cylindrical portion, the cylindrical portion including:

an inner periphery;

an outer periphery; and at least one of:

a machined inner surface disposed on the inner periphery and an exposed non-machined outer surface disposed on the outer periphery, the exposed non-machined outer surface arranged at a back side of the machined inner surface; and a machined outer surface disposed on the outer periphery and an exposed non-machined inner surface disposed on the inner periphery, the exposed non-machined inner surface arranged at a back side of the machined outer surface.

10. The motor housing according to claim 9, wherein the cylindrical portion includes the machined inner surface, the exposed non-machined inner surface, the machined outer surface, and the exposed non-machined outer surface.

11. The motor housing according to claim 10, wherein the exposed non-machined inner surface is disposed further from a central longitudinal axis of the cylindrical portion than the machined inner surface.

12. The motor housing according to claim 11, wherein the exposed non-machined inner surface is disposed in and at least partially defines a recess of the inner periphery.

13. The motor housing according to claim 12, wherein the recess is structured and arranged to receive a stator.

14. The motor housing according to claim 12, wherein the machined inner surface extends over an entirety of the inner periphery outside of the recess.

15. The motor housing according to claim 10, wherein:

the outer periphery of the cylindrical portion includes a convex portion protruding from the exposed non-machined outer surface; and the machined outer surface is disposed on the convex portion.

16. The motor housing according to claim 15, wherein the machined outer surface extends over an entirety of a top of the convex portion.

17. The motor housing according to claim 15, wherein an axial length of the convex portion is ⅓ of an axial length of the outer periphery.

18. The motor housing according to claim 15, wherein:

the convex portion has a rectangular-shape; and a long side of the convex portion extends in a circumferential direction of the cylindrical portion.

19. The motor housing according to claim 18, wherein:

the die cast body further includes a flange disposed at an axial end of the cylindrical portion, the flange protruding radially outward from the cylindrical portion and extending circumferentially around the cylindrical portion; and the long side of the convex portion contacts and extends along the flange.

20. The motor housing according to claim 1, wherein:

the at least one machined surface further includes an additional outer machined surface disposed on the outer peripheral surface, the additional outer machined surface arranged on an additional convex portion that protrudes from the non-machined surface disposed on the outer peripheral surface;

the convex portion and the additional convex portion each have a rectangular-shape with a long side extending in a circumferential direction of the cylindrical portion; and the convex portion and the additional convex portion are arranged spaced apart from one another in the circumferential direction.

* * * * *